United States Patent [19]
Brown

[11] 3,756,269
[45] Sept. 4, 1973

[54] MAXIMUM LIQUID LEVEL CONTROL VALVE

[76] Inventor: Harley Brown, R.R. 6, Box 150, Bedford, Ind. 47421

[22] Filed: Nov. 19, 1971

[21] Appl. No.: 200,563

Related U.S. Application Data

[63] Continuation-in-part of Ser. No. 55,430, July 16, 1970, abandoned.

[52] U.S. Cl.................... 137/446, 137/448, 251/298
[51] Int. Cl............................................. F16k 33/00
[58] Field of Search................... 137/424, 425, 416, 137/413, 420, 434, 443, 419, 422, 445, 446, 441, 448, 527.4; 251/84, 298

[56] References Cited
UNITED STATES PATENTS

| | | | |
|---|---|---|---|
| 1,382,027 | 6/1921 | Sweeny | 137/420 |
| 1,492,272 | 4/1924 | Sperling | 137/443 |
| 2,499,409 | 3/1950 | Norway | 137/448 X |
| 2,504,638 | 4/1950 | Browning | 137/446 X |
| 2,569,110 | 9/1951 | McGillis et al. | 137/448 |

Primary Examiner—Martin P. Schwadron
Assistant Examiner—David R. Matthews
Attorney—C. David Emhardt

[57] ABSTRACT

A valve for automatically preventing the addition of liquid to a tank beyond a predetermined maximum level. A float is pivotably hinged to a hollow valve body mounted to the tank wall. In one embodiment, a pair of cams are actuated by the float forcing a stem to cause a flap valve to open or close. The first cam closes the flap valve when the liquid reaches a predetermined level thereby preventing additional liquid from entering the tank. The second cam opens the flap valve when the liquid is below a predetermined level. In another embodiment, a lever arm movable by the float is pivotally engageable with links connected to a stem having a valve mounted thereon. A counterweight is attached to the float thereby balancing the float in the liquid.

5 Claims, 8 Drawing Figures

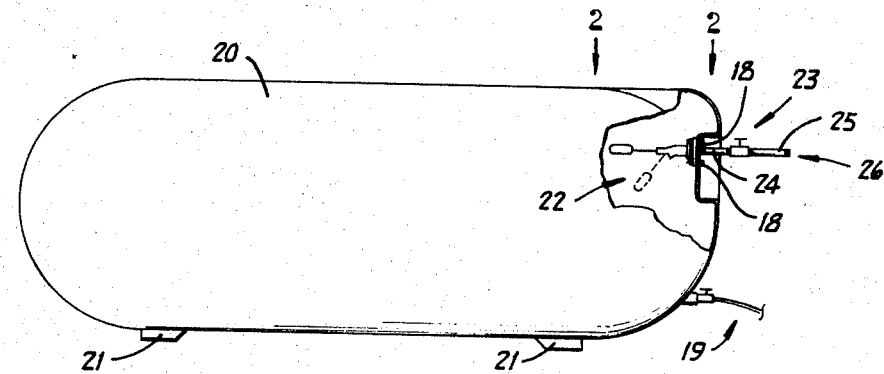
Fig.1.
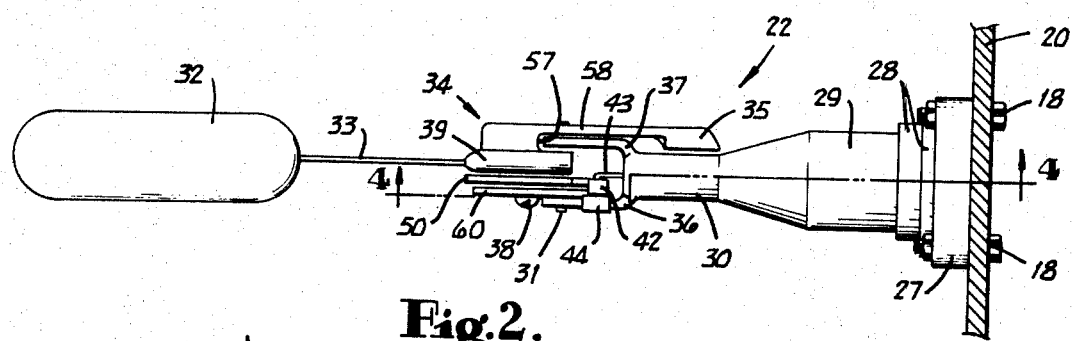
Fig.2.
Fig.3.
INVENTOR
HARLEY BROWN

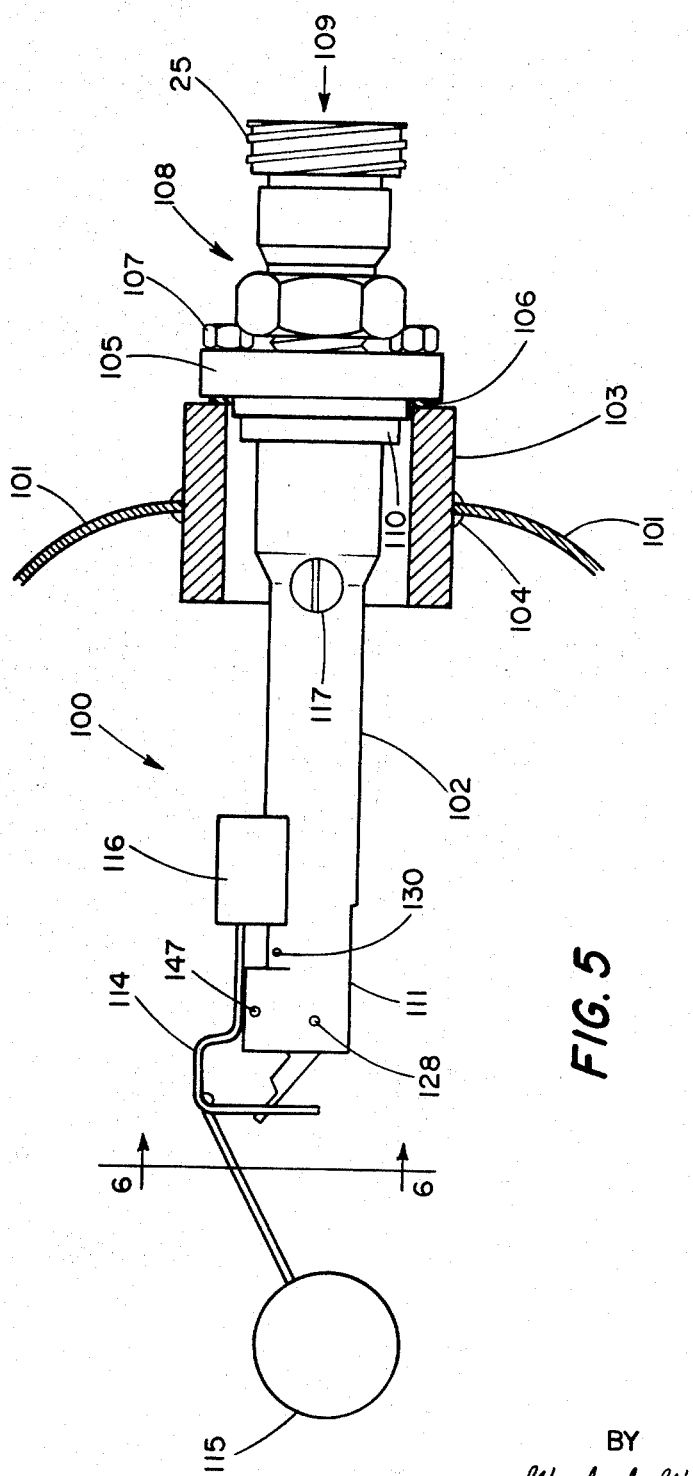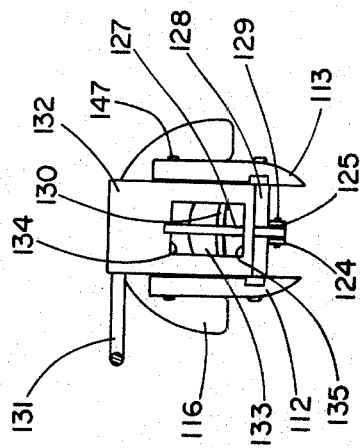
INVENTOR
HARLEY BROWN
BY
Woodard, Weikart, Emhardt & Naughton
ATTORNEYS

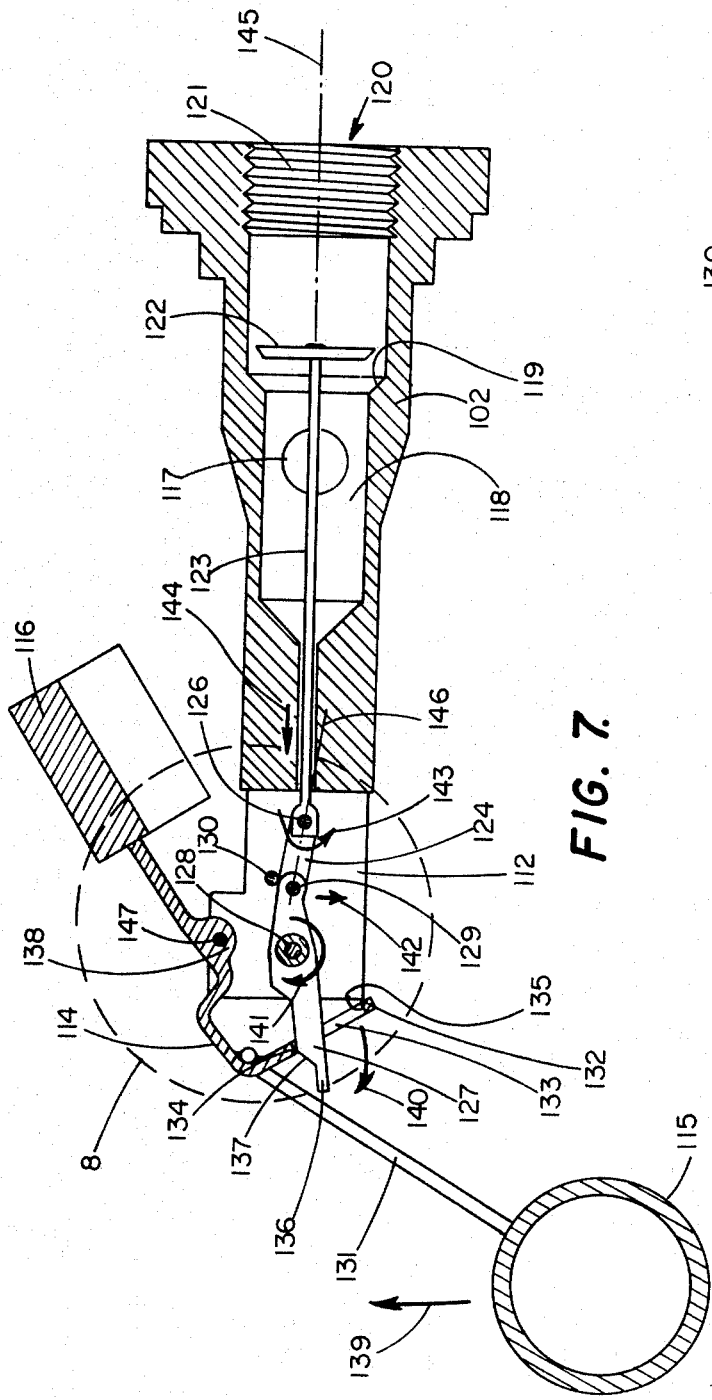
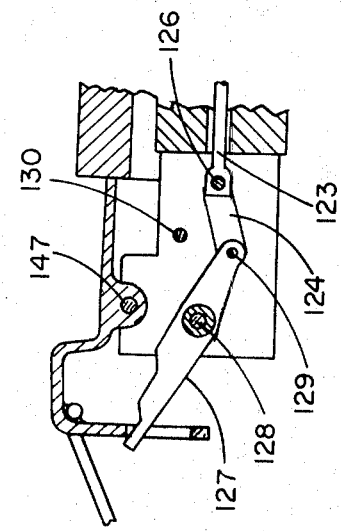
FIG. 7.
FIG. 8.
INVENTOR
HARLEY BROWN
BY
Woodard, Weikart, Emhardt
& Naughton
ATTORNEYS 3,756,269

MAXIMUM LIQUID LEVEL CONTROL VALVE

CROSS REFERENCE TO RELATED APPLICATION

This application is a continuation-in-part of my parent U. S. patent application, Ser. No. 55,430 filed July 16, 1970 now abandoned and entitled "Maximum Liquid Level Control Valve."

BACKGROUND OF THE INVENTION

1. Field of the Invention

This invention is an automatic valve for controlling the maximum liquid level within a tank.

2. Description of the Prior Art

Upon storing liquid in a tank, it is often necessary to control the maximum amount of liquid in the tank. For example, some state statutes prohibit filling a tank beyond 80 percent of its capacity with liquid petroleum gas. Thus, it is desirable to equip such tanks with a device which automatically prevents the tank from being filled in excess of the predetermined level.

A variety of control devices have been designed for controlling the flow of liquid or gas. Five such devices are shown in the following U. S. Pat. Nos.: 1,492,272 to Sperling; 2,499,409 to Norway; 2,504,638 to Browning; 2,569,110 to McGillis; and 2,431,721 to Wiseman et al. Typically these devices utilize a float valve combination to slowly open or close the fluid inlet port. As a result, the valve when closing may not seat properly on the valve seat. Disclosed herein is a linkage for operably connecting the float to the valve in such a way that the valve will snap shut thereby insuring that the valve seats properly on the valve seat.

SUMMARY OF THE INVENTION

One embodiment of this invention is a valve for limiting the flow of liquid into a tank comprising a valve body mountable horizontally to a side wall of the tank at an elevation corresponding to a maximum liquid level and having a passage for liquid to flow through into the tank, a float pivotally hinged to the body, a flap valve movably mounted to said body, and operable under incoming liquid pressure to close the passage, the wall and the body being positioned entirely within the tank and not extending therefrom, a cam device movable by the float and operative to open and close the flap valve.

Another embodiment of this invention is a valve for limiting the flow of liquid into a tank, a valve body mountable interiorly in the tank and having a passage with a valve seat for liquid to flow through into the tank, a float pivotally hinged to the body, a stem extending through the body and being movable by the action of the float, wherein the improvement comprises, a wall movably mounted to the body being biased toward the valve seat to close the passage by incoming fluid pressure, a member pivotally mounted to the body and having a portion engageable by the float to force the member to pivot as the float pivots, and, a link connected to and between the member and the stem and being movable by the member from a first position wherein the link positions the stem in the body forcing the wall away from the seat to a second position wherein the link positions the stem in the body forcing the wall against the seat.

It is an object of the present invention to provide a new and improved fluid valve.

It is another object of the present invention to provide a valve as described above that is readily adaptable to tanks presently in use.

Yet another object of the present invention is to provide a valve which snaps closed when fluid has reached a predetermined level in a tank.

Related objects and advantages of the present invention will be evident from the following description.

BRIEF DESCRIPTION OF THE DRAWING

FIG. 1 is a side view of a liquid petroleum tank with a portion cut away showing an automatic valve incorporating the present invention.

FIG. 2 is a top enlarged view of the automatic valve of FIG. 1 viewed in the direction of arrows 2—2.

FIG. 3 is a view of the valve of FIG. 2 viewed in the direction of arrows 3—3.

FIG. 5 is a side view of an alternate and preferred embodiment of an automatic valve incorporating the present invention.

FIG. 6 is a cross sectional view taken along the line 6—6 of FIG. 5 and viewed in the direction of the arrows.

FIG. 7 is a cross sectional side view of the valve of FIG. 5 taken along the longitudinal center line axis showing the valve in the open position and the float in the most downward position.

FIG. 8 is a fragmentary view of the area enclosed by circle 8 of FIG. 7 only showing the float arm in the upward position.

DESCRIPTION OF THE PREFERRED EMBODIMENTS

Figure 4:
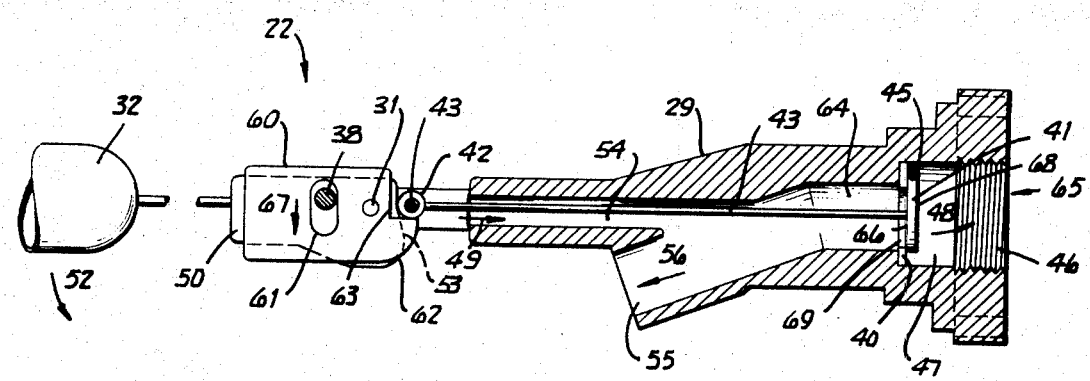
FIG. 4 is a sectional view of the valve of FIG. 2 taken along the line 4—4 and viewed in the direction of the arrows.

For the purposes of promoting an understanding of the principles of the invention, reference will now be made to the embodiments illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a liquid petroleum tank 20 mounted on feet 21 and having an automatic valve 22 mounted to the wall of the tank. Pipe 24 passes through the wall of tank 20 and is threaded into valve 22. A conventional manual valve 23 is threaded on the opposite end of pipe 24. A second pipe 25 is threaded into valve 23 having an inlet 26 for use in filling tank 20 with liquid petroleum gas. A conventional outlet valve 19 is mounted to tank 20 for the liquid petroleum gas to exit. Pipes are mounted to valve 19 carrying the gas to various user locations.

A top view of automatic valve 22 is shown in FIG. 2 having a mounting base 27 integrally connected to hollow valve body 29 by shoulders 28. Base 27 is fastened to the side wall of tank 20 by fasteners 18. End 30 of valve body 29 is U-shaped having a pair of arms 36 and 37 rotatably holding float frame 34, open cam 50, and close cam 60. Fastener 31 is anchored in arms 36 and 37 and passes through portion 39 and arm 58 of frame 34 and cams 50 and 60. Fastener 31 may be anchored to arms 36 and 37 in any number of ways. For example, a flat may be provided on fastener 31 for abuttingly engaging flat sided holes in arms 36 and 37. One end of rod 33 is fixedly fastened to portion 39 of float frame 34 while the opposite end is fixedly fastened to float 32 which is buoyant in liquid petroleum gas. Float 32 may be made from metal assuming the float is hollow and sealed. Counterweight 35 is integrally attached to float frame 34 by float arm 58 thereby balancing float 32 in a horizontal position when the liquid petroleum gas has reached the level of the longitudinal axis of valve 22. Recess 57 is provided in frame 34 between portion 39 and float arm 58 for arm 37 to project within allowing frame 34 to freely rotate thereon.

Referring to FIGS. 2 and 3, cams 50 and 60 are rotatably mounted on fastener 31. A second fastener 38 freely passes through slot 61 of close cam 60 and also freely through a hole, not shown, in close cam 50 and is threaded into float frame 34. Fastener 38 prevents relative motion between cam 50 and float frame 34 while allowing cam 60 to move relative to cam 50 and float frame 34 in an amount corresponding to the length of slot 61. Cams 50 and 60 slidingly engage roller 42 freely mounted to stem 43. A C-shaped guide 44 slidingly engages arm 36 and is fastened to the end of stem 43 adjacent roller 42. Stem 43 is bent at a right angle, as may be seen from FIG. 4, passing through roller 42 and then through passages 54 and 64 to flap valve 41.

FIG. 4 is a cross sectional view of valve 22 taken along the line 4—4 of FIG. 2 and viewed in the direction of the arrows. Threads 46 are provided in the mounting end of valve 22 for receiving pipe 24 (FIG. 1). Chamber 47 (FIG. 4) is formed in valve body 29 having a diameter greater than passage 64 and thereby forming annular valve seat 40 for flap valve 41 to sealingly rest against preventing liquid flow in the direction of arrow 65. Passage 64 is connected to stem passage 54 and channel 55. Flap valve 41 is pivotally hinged by pin 45 anchored in the side walls of chamber 47 thereby allowing the valve to pivot open in the direction of arrow 48. End 66 of stem 43 passes through the center 69 of annular valve seat 40 abutting against valve flap 41. Stem 43 is not connected to flap 41 but merely rests against the valve flap. The end of open cam 60 nearest roller 42 has an L-shaped recess 63 and a quarter circular portion 62 for abutting roller 42. The end of closed cam 50 nearest roller 42 has a camming surface 53 also abuttingly engaging roller 42.

As explained previously many states have laws prohibiting filling a liquid petroleum gas tank to more than a certain percentage of its capacity. The present automatic valve will insure that filling is accomplished in accordance with the law. To fill tank 20 with liquid petroleum gas, the source of the gas is sealingly connected to pipe 25 (FIG. 1) and manual valve 23 is turned to the open position allowing the gas to flow through pipe 24 to chamber 47 (FIG. 4) of valve 22. Of course, valve 22 has been previously positioned in the tank to open only when the tank contains less liquid petroleum gas than the maximum authorized amount. For example, if a statute provides a tank shall not be filled to more than 50 percent of its capacity, then valve 22 would be mounted to the tank at the center line of the tank assuming the tank to be symmetrical about the center line. Thus, if the liquid petroleum gas level is lower than the automatic valve, float 32 will move in the direction of arrow 52 (FIG. 4) causing the cam surface 53 of open cam 50 to rotate beyond portion 62 of cam 60 and push roller 42 and stem 43 in the direction of arrow 49. In the meantime, as float 52 and open cam 50 rotate about fastener 31 in the counter-clockwise direction as indicated by arrow 52, fastener 38 will move down slot 61 in the direction of arrow 67 allowing cam 60 to remain still with respect to fastener 31 since roller 42 is engaged with recess 63. Eventually, cam surface 53 will push roller 42 away from L-shaped recess 63 moving the roller in the direction of arrow 49. End 66 of stem 43 will push flap valve 41 open in the direction of arrow 48 allowing the liquid petroleum gas to flow through passage 64 and channel 55 in the direction of arrow 56 into the tank. As the level of liquid petroleum gas within the tank rises, float 32 will move in a direction opposite arrow 52. In addition, open cam 50 will rotate about fastener 31 in a clockwise direction opposite of arrow 52. Fastener 38 will simultaneously rise to the top of slot 61 in a direction opposite to arrow 67 eventually forcing close cam 60 to rotate about fastener 31 along with float 32 and open cam 50. The pressure exerted by the incoming liquid petroleum gas in the direction of arrow 65 agaisnt surface 68 of flap valve 41 will force stem 43 and roller 42 against cams 50 and 60. As float 32 rises in a direction opposite of the arrow 52, roller 42 will eventually roll off of portion 62 and snap into L-shaped recess 63 of cam 60 thereby allowing valve 41 to pivot in a direction opposite arrow 48 and to snap closed against valve seat 40 preventing the flow of liquid petroleum gas into the tank. Of course, if the level of the liquid petroleum gas within the tank is sufficiently high, flap valve 41 will be closed against annular valve seat 40 thereby preventing the liquid petroleum gas from flowing into the tank. Once flap valve 41 has closed, it will be impossible to add fluid to the tank and therefore the manual valve 23 (FIG. 1) should be closed and pipe 25 should be disconnected from the source of the liquid petroleum gas. As roller 42 and stem 43 move along the longitudinal axis of valve 22, guide 44 slidingly embraces arm 36 therefore insuring that roller 42 is always in line with cams 50 and 60. It should be noted that a suitable seal should be utilized between base 27 and the side wall of tank 20 to prevent escape of liquid from the tank through the mounting holes.

The preferred embodiment of the valve is shown in FIGS. 5 through 8. Valve 100 has a main body 102 which extends horizontally through bushing 103 secured to tank side wall 101 by welds 104. Body 102 has a flanged end 105 abuttable against the outside or exterior end of bushing 103 with a sealing gasket 106 being positioned therebetween and with conventional fasteners 107 securing the flanged end to the bushing. Body 102 has a hollow passage 120 (FIG. 7) extending therethrough with internal threads 121 provided to receive a double back check fill valve 108 connected to the fluid input line 25.

The incoming fluid flows into inlet 109 of line 25 and into passage 120 of body 102. The incoming fluid then flows out of the main body through holes 117 and into the tank formed by side wall 101. The side wall is shown fragmented in FIG. 5 to conserve drawing space. The valve limits the flow of liquid into the tank with the valve body being mountable interiorly in the tank. Passage 120 has a valve seat 119 through which the liquid flows when valve wall 122 is positioned outwardly therefrom. Valve wall 122 is movable against valve seat 119 thereby preventing the incoming fluid from flowing into the tank.

A buoyant float 115 is pivotally hinged to main body 102. Float 115 is mounted to rod 131 which has a counterweight 116 mounted to the opposite end. End portion 111 of body 102 is bifurcated forming arms 112 and 113 (FIG. 6). A slotted flange 114 is provided on rod 131 and is positioned between arms 112 and 113. An enlarged boss 138 is integrally connected to rod 131 and flange 114 and is pivotally mounted to arms 112 and 113 by a horizontally extending pin 147. Thus, as the level within the tank raises vertically, float 115 will pivot in the direction of arrow 139 with counter weight 116 moving downwardly towards the main body.

Flange 114 has a slot 133 with a top end 134 and a bottom end 135. Member 127 has a portion extending through slot 133 and is pivotally mounted by pin 128 to and between arms 112 and 113. The inner end of member 127 is pivotally connected to a pair of links 124 and 125 which have their opposite ends pivotally connected to stem 123. Links 124 and 125 are parallel and are positioned on the opposite sides of member 127 being pivotally connected to member 127 by pin 129. Stem 123 extends through main body 102 and is movable by the action of float 115. Wall 122 is movably mounted to body 102 by being fixedly secured to movable stem 123. The incoming fluid pressure biases wall 122 towards valve seat 119 to close passage 118.

In operation, the float pivots upwardly until eventually wall 122 snaps to the closed position. As the incoming fluid fills the tank, float 115 will pivot upwardly in the direction of arrow 139 until eventually top end 134 of slot 133 moves away from cam surface 137 formed by the outward portion 136 of member 127. The bottom end 135 of slot 133 will eventually contact the stationary member 127 thereby forcing member 127 to pivot a round pin 128 in the direction of arrow 141. The bottom end of bracket 114 will also be pivoting in the direction of arrow 140. As the longitudinal axes 146 of links 124 and 125 becomes parallel with the longitudinal axis 145 of stem 123, pin 129 will move in the direction of arrow 142. As pin 129 becomes positioned below axis 145, links 124 and 125 along with member 127 will snap downwardly in a quick manner. Thus, links 124 and 125 will pivot about pin 126 in the direction of arrow 143. Pin 126 pivotally secures links 124 and 125 to the end of stem 123. Link 123 is not shown in FIG. 7 to more clearly illustrate the connections between the links and member 127. As pin 129 moves below axis 145, the incoming fluid pressure will force wall 122 and stem 123 in the direction of arrow 144 thereby quickly closing passage 118 and preventing further fluid from flowing into the tank. As fluid is withdrawn from the tank, and the level of the fluid decreases, float 115 will pivot downwardly in a direction opposite of arrow 139 so that the top end 134 of slot 133 will contact surface 137 forcing member 127 to pivot in a direction opposite of arrow 141 until member 127 and links 123 and 124 move from the fully closed position as shown in FIG. 8 to the fully open position as shown in FIG. 7. A rod 130 is mounted to and between arms 112 and 113 and is positioned to contact links 123 and 124 so as to limit the upward motion of the links. Links 123 and 124 are shown positioned in FIG. 7 so as to position stem 123 in body 102 forcing the saucer shaped disc wall 122 away from seat 119. The second position of the links is shown in FIG. 8 wherein the links position the stem in the body forcing wall 122 against seat 118. When the links are in the position shown in FIG. 7, the stop rod 130 limits the upward travel of the links when the float is in the most downward position. The stem is of sufficient length to position wall 122 away from the valve seat when the links are positioned against stop rod 130.

The horizontally extending longitudinal axis 145 extends centrally through disc wall 122 and centrally through passage 118. As previously mentioned, the inner end of member 127 is positioned above axis 145 when the float is in the most downward position. The float frame 132 is composed of rod 131 which is integrally connected to bracket 114. The slot in bracket 114 is of sufficient length to allow the outer end of member 127 to quickly move from the bottom end of the slot to the top end of the slot when the float pivots upwardly and the inner end of member 127 passes from atop axis 145 to below the axis. The valve body is generally cylindrical in configuration and has shoulders 110 immediately adjacent the flanged end 105.

It will be evident from the above description that the present invention provides a valve for preventing the flow of liquid into a tank beyond a predetermined maximum level. It will also be evident that the valve does not employ components which will jam. Also it will be evident that the valve is readily adaptable to tanks presently in use.

While the invention has been illustrated and described in detail in the drawings and the foregoing description, the same is to be considered as illustrative and not restrictive in character, it being understood that only the preferred embodiments have been shown and described and that all changes and modifications that come within the scope of the invention are desired to be protected. Many liquids, such as gasoline or ammonia, may be controlled by the present valve, up to pressures of 270 p.s.i.

The invention claimed is:

1. A valve for limiting the flow of liquid into a tank comprising:
    - a valve body mountable horizontally to a side wall of said tank at an elevation corresponding to a maximum liquid level and having a passage for liquid to flow through into said tank;
    - a float pivotally hinged to said body;
    - a flap valve movably to said body and operable under incoming liquid pressure to close said passage, said flap valve and said body being positioned entirely within said tank and not extending therefrom;
    - a cam device movable by said float and operative to open and close said flap valve; and wherein:
    - said cam device consists of a first cam element with a recess allowing said flap valve to close and a second cam element with a cam surface for opening said flap valve, said first cam element and said second cam element are pivotally hinged to said valve body, said second cam element has a control pin cantileveredly mounted thereto projecting through said first cam element;
    - said second cam element and said float are interconnected to pivot together at all times;
    - said first cam element is movable with respect to said second cam element; and further comprising a mounting rod mounted to said body and fixedly connected to said second element, said rod projects through said first element.

2. The valve of claim 1 additionally comprising:
a movable stem extending longitudinally through said body with a first end and a second end, said first end engages said flap valve, said second end has a roller thereon abuttingly engaging said cam device and wherein said control pin contacts said first element causing rotation thereof at maximum liquid level allowing said roller to roll off said cam surface and snap into said first cam element recess;
a guide on said body receiving said second end retaining said roller against said cam device;
a counterweight connected to said float for balancing said float in said liquid; and wherein:
said valve body has a flanged end mountable to said tank by fasteners.

3. A valve for limiting the flow of liquid into a tank comprising:
a valve body mountable horizontally to a side wall of said tank at an elevation corresponding to a maximum liquid level and having a passage with a valve seat for liquid to flow through into said tank;
a float pivotally hinged to said body;
a stem extending through said body and being movable by the action of said float and having a longitudinal axis;
a disc fixedly mounted to an end of said stem adjacent said valve seat being biased toward said valve seat to close said passage by incoming fluid pressure;
an elongated member pivotally mounted to said body at a location above said axis and having an outer end and an inner end;
a link having a first end pivotally connected to said inner end of said elongated member and having a second end pivotally connected to said stem at a location on said axis;
a stop fixedly mounted on said body about said axis limiting upward movement of said elongated member and said link;
a bracket mounted on said float having a slot through which said outer end of said elongated member projects, said slot having a top end which abuts said outer end of said elongated member as said float pivots downwardly forcing said inner end of said elongated member and said link above said axis and against said stop holding said disc away from said valve seat, said slot has a bottom end which abuts said outer end of said elogated member as said float pivots upwardly forcing said inner end of said elongated member and said link below said axis allowing said disc to seat on said valve seat, said slot is of sufficient length to allow said outer end of said elongated member to quickly move from said bottom end to said top end when said float pivots upwardly and said inner end of said elongated member passes from atop said axis to below said axis.

4. The valve of claim 3 and wherein:
said stem is of sufficient length to position said wall away from said valve seat when said link is in said first position.

5. The valve of claim 4 wherein:
said tank has a side wall with a hollow bushing mounted to and extending therethrough;
said valve body extends horizontally through said bushing into said tank and has a flanged end secured outwardly against said bushing; and,
said body is internally threaded to receive an input liquid line.

* * * * *

UNITED STATES PATENT OFFICE
CERTIFICATE OF CORRECTION

Patent No. 3,756,269      Dated September 4, 1973

Inventor(s) Harley Brown

It is certified that error appears in the above-identified patent and that said Letters Patent are hereby corrected as shown below:

In column 6, line 49 insert --mounted-- after the word "movably" and before the word "to".

Signed and sealed this 1st day of January 1974.

(SEAL)
Attest:

EDWARD M. FLETCHER, JR.
Attesting Officer

RENE D. TEGTMEYER
Acting Commissioner of Patents